July 13, 1948.  C. A. GRET  2,445,139
SHOCK ABSORBING DEVICE FOR AIRCRAFT
AND OTHER POWER-DRIVEN VEHICLES
Filed Nov. 3, 1942  2 Sheets-Sheet 2

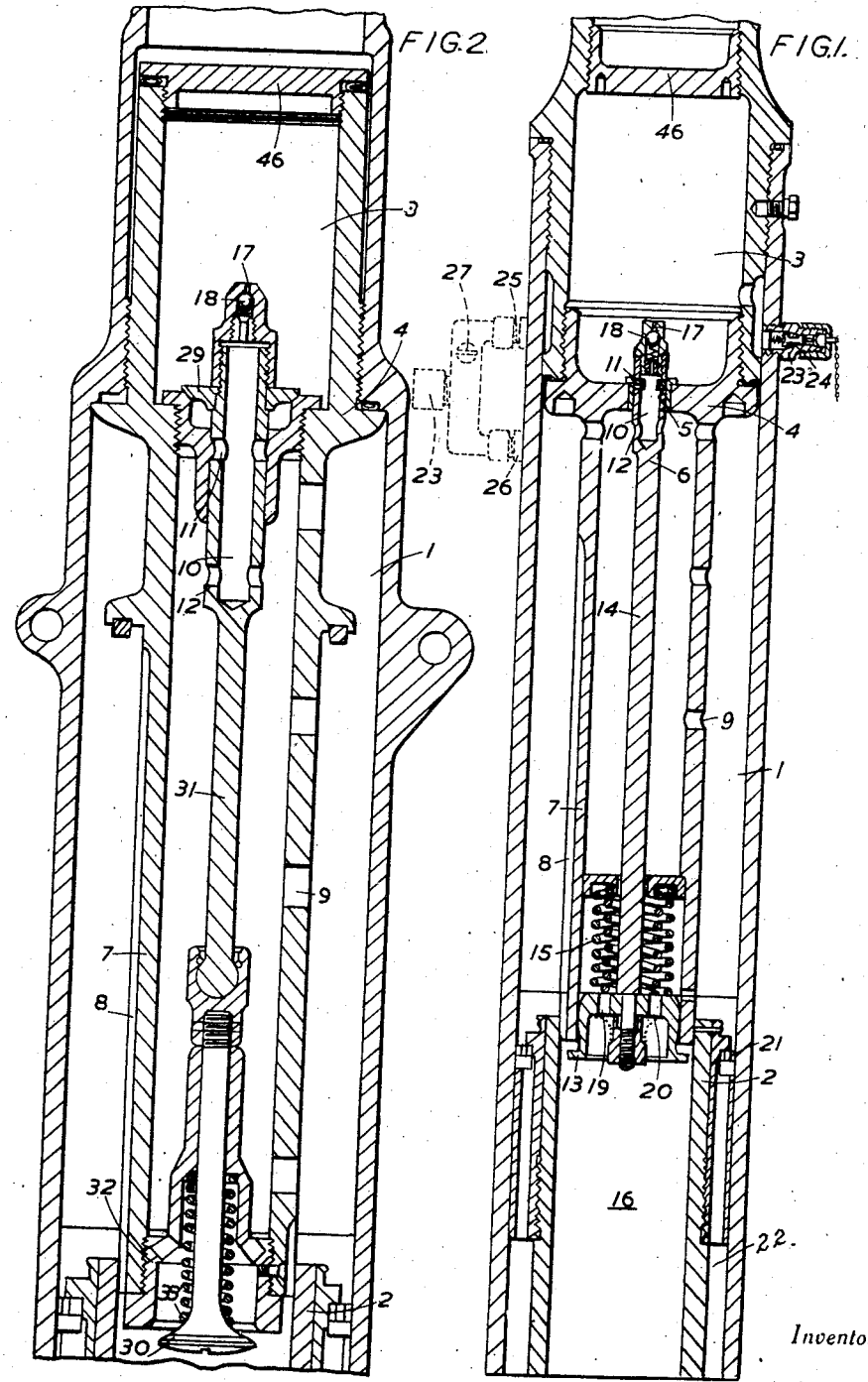

Inventor
Charles A. Gret
By
Attorney

Patented July 13, 1948

2,445,139

UNITED STATES PATENT OFFICE 2,445,139

SHOCK ABSORBING DEVICE FOR AIRCRAFT AND OTHER POWER-DRIVEN VEHICLES

Charles Albert Gret, Wolverhampton, England

Application November 3, 1942, Serial No. 464,370
In Great Britain November 3, 1941

6 Claims. (Cl. 267—64)

This invention relates to shock absorbing devices or appliances used on power-driven vehicles including those employed on or in connection with the landing legs or oleos of aircraft, of the kind in which the shock absorbing medium is a gas, usually air under pressure, contained in a cylinder adapted to accommodate a piston, with or without a liquid medium such as oil. Air pressure in the cylinder is generally such as to sustain the weight of the vehicle when the piston is approximately at its mid position in the cylinder.

In the case of an aircraft, there is generally a wide or considerable variation in the weight laden and unladen. To obtain smooth taxying or travel on the ground, the longest or greater part of the piston stroke should be available, but with known mechanism the leg is only partly compressed or retracted when the aircraft lands unladen, due to the relatively short stroke of the piston, and hence smooth taxying is not obtained.

In order to improve taxying or travel on the ground, I propose according to the present invention, to provide for a lower gas or air pressure in the cylinder or cylinders effective for a short time after landing, said lowered pressure permitting an increased stroke of the piston in comparison with the stroke in known apparatus.

Means for lowering the pressure conveniently include an additional chamber which constitutes an extra volume or capacity, means of communication between said chamber and the normal air chamber next the piston, and control means adapted to allow passage of air or gas from the normal chamber to the second chamber on landing, said control means retaining in the second chamber air or gas so transferred so as to provide a lower gas or air pressure in the normal chamber and consequently a longer stroke of the piston while the aircraft is taxying following a landing.

Other features of the invention appear in the following description.

In the drawings,

Figure 1 shows in sectional elevation one embodiment of the invention with a control valve and an operating piston for moving said valve.

Figure 2 illustrates another form of control valve operated by a piston equivalent.

Figure 4:
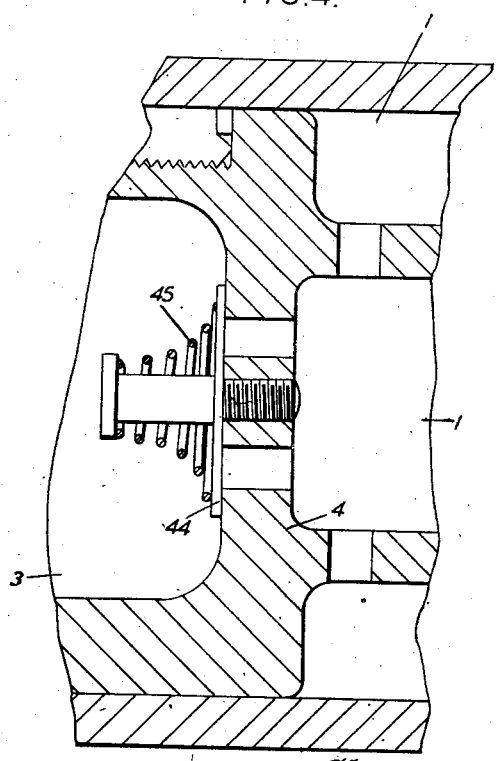

Figure 4 indicates a simple form of the invention wherein only a valve and spring are employed as a control means.

In the embodiment shown in Figure 1, the end of the normal air-compressing chamber 1 remote from the usual main piston 2, is provided with an extension to form the extra chamber 3 which is separated from the first chamber by a transverse wall 4 having a communicating passage 5 controlled by a valve 6 conveniently of the piston type. The two chambers can be aligned, and for convenience will be referred to as the primary chamber and the secondary chamber.

Extending from the transverse wall 4 is a fixed sleeve 7 the periphery of which is encircled by the bore of the main piston 2 which is in the form of a sleeve to co-operate with longitudinal grooves or depressions 8 in the fixed sleeve periphery, said grooves being of different lengths or tapered in depth so that as the piston telescopes in the compressive action, the effective area of the leakage path presented by the grooves progressively diminishes; alternatively, the grooves may be cut in the main piston bore, but for ease of manufacture, external constant depth grooves are preferable. The chamber inside the fixed sleeve 7 and the one external thereto are in permanent communication by means of holes 9 drilled in the sleeve, and thus the two chambers function as one.

The piston type control valve 6 operating in the transverse wall 4 has a short longitudinal passage 10 such that when the valve is lifted or moved following alighting impact, air can pass from the primary chamber to the secondary chamber, via two transverse ducts 11, 12, one above the wall and one below it, which intersect the longitudinal passage. So to move the control valve, an operating piston 13 is housed in the end of the fixed sleeve remote from the valve, and mechanically coupled by a rod 14. Opposing the opening movement of the valve is a resistance conveniently one or more springs 15 of the coiled compression type seated at one end on the back of the operating piston.

Air under pressure is introduced into the primary chamber and into the secondary chamber so that initially the pressure in both is the same. When taxying for take-off, work is done by the piston against the compressed air in the primary chamber in a compressive action which can be regarded as approximately isothermal.

On landing, the rate of telescoping (or functional equivalent) of the main piston 2 is such that high resistance is offered to flow of oil through the restricting grooves 8, and as a consequence, the oil pressure in the main oil chamber 16 is higher than air pressure in the primary chamber. The operating valve or piston 13 is thus moved against the resistance of its spring or springs, and by the mechanical coupling of the push rod or stem, opens the control valve, establishing communication between the primary air chamber and the secondary air chamber for the rest of the compression stroke by way of the longitudinal and radial passages in the control end of the valve. As the leg continues to contract, a certain quantity of air is moved from the primary chamber to the secondary chamber.

As the main piston 2 returns on the rebound stroke, the control valve closes when the main piston has travelled a very short distance and interrupts communication between the two chambers, more air being contained in the secondary chamber than was the case at the commencement of compressive action, i. e. the air pressure is higher. As a corollary, air pressure in the primary chamber is lower than the initial air pressure with the desired result of a longer stroke and smoother taxying.

If a pressure curve is plotted against piston displacement, the landing curve will rise in the normal manner until it reaches the point at which the valve opens, when due to the increased volume of air which becomes available, and effective, the curve will flatten out and continue to rise but at a lower rate. The curve or curves for subsequent displacements of the piston when compressing the air will be less steep and at a lower level than that of the first and rapid displacement. The pressure level at which air or gas is forced from the primary chamber to the secondary chamber is determined by the areas of the valves effective and the resistance of the opposed spring or springs.

Through the control valve 6 or the transverse wall is a passage 17 of small cross-sectional area which acts as a slow leakage path over a period of time e. g. 30 seconds and eventually ensures the same pressure in both chambers. Said area is such as not to affect noticeably compression or expansion of the air or gas in the system under landing or taxying conditions, but is sufficient to resolve pressure difference between the chambers over a pre-determined period such as enumerated, so that for landing or take-off, the initial equality of pressure is automatically provided. To prevent oil passing into the secondary air chamber, through the passage 17, when the leg is in the horizontal position, a ball valve 18 may be associated with the passage.

Oil which has been forced on landing from the main oil chamber 16 into the chamber above the piston crown is able to return rapidly not only through the restricting grooves, but also through the operating valve by way of large holes 19 sealed or unsealed by a disc valve 20 situated on the face of the operating piston remote from the control valve. In case of a second or successive bump, shock absorption is done on oil as on the first bump, instead of on aerated oil as occurs on most existing apparatus.

Rebound damping provision may include a floating ring 21 mounted near the head of the main piston and provided with restricted passages which throttle the oil when the piston and ring are moving in one direction and the latter is seated at the relevant end of its relative motion. When the piston moves in the opposite direction, the ring moves relatively thereto, the passages no longer restrict, and oil can flow freely to an annular chamber 22 around the piston from the reservoir. This device is, in itself, known.

A convenient means for charging the two air chambers comprises a valve box 23 at one side of the cylinder, a non-return valve 24 therein, and two connections 25, 26 respectively to the two chambers. If desired, a cock or tap 27 may be incorporated in one of the connections and provided with manual operating means operable by remote control and by contiguous control to allow the two chambers to be put into mutual communication or isolated the one from the other. This manual control has for its purpose to reduce the compression ratio by utilising the combined capacities of the two chambers, and provide a longer stroker for certain conditions e. g. taxying the aircraft in an unladen state for comparatively long distances.

In Figure 1 is illustrated diagrammatically a modification of the valve arrangement appearing in Figure 2. A double-ended poppet valve is employed, the two valve ends 29, 30 of which do not seat at the same time. One end of the stem 31 is carried in the transverse wall 4, and the other end is slidably mounted in a second transverse wall 32 spaced from the first. The valve end 29 controls communication between the two chambers 1, 3 and the other is adapted to lift the combined member at appropriate times by pressure of oil when the leg is telescoping. 33 is a coiled compression spring for returning the combined member to starting position. The manner in which this modification functions is the same as that described in connection with the embodiment depicted in Figure 1.

Figure 3:
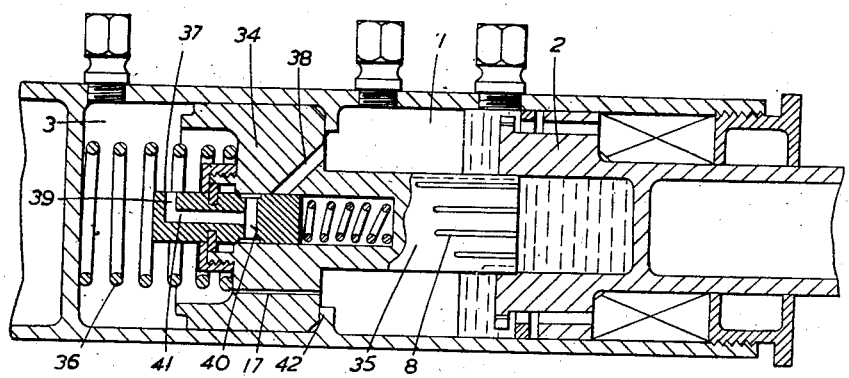
Figure 3 depicts a further modification in which the control valve is mounted on the head of a floating piston.

According to the embodiment shown in Figure 3, the transverse wall separating the primary air chamber from the secondary air chamber is movable and takes the form of a floating piston 34 which carries a stalk 35 with grooves 8 which act as in Figure 1. Said floating piston 34 is held in the position shown by a coiled compression spring 36. Any suitable kind of control valve may be adopted; conveniently a piston valve 37 is accommodated in a bore in the floating piston for co-operation with an inclined passage 38 leading from the underface of the piston and the primary air chamber 1 to said bore. In the valve are formed three holes; a transverse one 39 in the upper part of the valve which protrudes beyond the piston into the secondary chamber 3, a transverse one 40 in the lower part of the piston encircled by the bore, and a longitudinal one 41 connecting the two transverse holes.

When the main piston 2 telescopes into the main cylinder, air thereby compressed in the primary chamber 1, moves the floating piston 34 from its inner position (against the stop 42) against the resistance of the spring 36 in the same direction as that of the main piston. The volume of the primary chamber is larger than that of the secondary chamber, and thus the head of the floating piston will come into contact with the adjacent end of the secondary chamber before the main piston has reached the end of its stroke. Just before such contact occurs, the control valve is opened by abutting against the secondary chamber end.

On landing, the velocity of the main piston is such that oil resistance below the stalk 35 produces movement of the floating piston 34 which consequently compresses the air in the secondary chamber 3 up to the stage of full compression. Just prior to this point, however, the control valve is opened in manner above described to provide free passage of air from one chamber to the other. As the leg continues to contract, a certain quantity of air is moved from the primary chamber to the secondary chamber, as in the other examples. As the pistons return on re-expansion of the air, the control valve closes when the floating piston has travelled a very short distance and interrupts communication between the two chambers. The pistons continue to move more or less in unison until the floating piston reaches its annular stop 42 after which the main piston travels alone. As however, the main piston continued its compressive stroke after the floating piston had been stopped by contact with the end of the secondary air chamber, air has been moved from the primary chamber to the secondary chamber, and therefore air pressure in the primary chamber is lower than the initial air pressure subsequent to closure of the secondary chamber by the floating piston. To balance friction of the floating piston, a spring may be interposed between the piston and the secondary chamber end.

In the simple form of the invention shown in Figure 4, the passage between the two chambers is controlled by a disk valve 44 pressed on to its seat by a coiled compression spring 45 and located in the transverse wall 4 separating the two chambers. Transfer of air from the primary chamber 1 to the secondary chamber 3, and retention of transferred air in the secondary chamber with subsequent lowered pressure in the primary chamber and consequent longer stroke of the main piston during taxying, are similar to the functions described in connection with the embodiment illustrated in Figure 1.

Instead of connecting the two chambers externally as before described, the compression ratio may be reduced when taxying the aircraft in an unladen state for comparatively long distances, by manually moving the control valve to the position in which the two chambers function as one by utilisation of their combined capacities, with free communication between them. The means by which the control valve is so moved, are suitably coupled to remote control operable by the pilot.

A permanent change in the compression ratio may be made by changing the end plug 46 of the secondary chamber, as will be clear on referring to Figure 1.

Having thus described my invention, what I claim is:

1. In a shock absorbing device for aircraft, a casing including a chamber for gas under pressure, a piston in the casing to contain liquid and arranged to receive the impact force of the airplane on landing, means to cause the impact movement of the piston to force liquid into the gas chamber to compress the gas therein, the means for admitting the liquid from the piston to the primary gas chamber being formed to restrict liquid flow into the primary gas chamber to reduce the otherwise incident rise in gas pressure in the primary gas chamber, a secondary gas chamber arranged in the casing, a valved communication between the respective gas chambers and opening to establish communication between said chambers, and means including an operable connection to the valve operable by the difference of pressure between the gas in the primary gas chamber and the liquid in the piston to operate said operative connection and establish communication between the primary gas chamber and the secondary gas chamber.

2. A construction as defined in claim 1, wherein the operative connection between the valve and the pressure difference operating means is completely mechanical.

3. In a shock absorbing device for aircraft, a casing including a primary gas chamber for gas under pressure, a piston in the casing to contain liquid and arranged to receive the impact force of the airplane on landing, means to cause the impact movement of the piston to force liquid into the primary gas chamber to compress the gas therein, the means for admitting the liquid from the piston to the primary gas chamber being formed to restrict oil flow into the primary gas chamber to reduce the otherwise incident rise in gas pressure in the primary gas chamber, a secondary gas chamber arranged in the casing, a valved communication between the respective gas chambers and opening to establish communication between said chambers, and an operating valve between the primary gas chamber and the piston, said valve being responsive to pressure differences between the gas in the primary gas chamber and the liquid in the piston and connected to the first mentioned valve to automatically open said first mentioned valve to permit the gas in the primary gas chamber to enter the secondary chamber.

4. A construction as defined in claim 1, wherein means provided for restricting the flow of liquid from the piston and to the primary gas chamber includes a series of narrow channels forming the sole path of communication between the piston and the primary gas chamber.

5. In a shock absorbing device for aircraft, a cylinder, a primary gas chamber in the cylinder to receive gas under pressure, a liquid containing impact responsive piston slidable in the cylinder, means formed in one wall of the gas chamber to permit liquid from the piston to flow to the primary gas chamber under materially restricted volume, a secondary gas chamber formed in the casing, a normally closed valve controlling communication between the primary gas chamber and secondary gas chamber, an operating valve responsive to the pressure differential between the gas in the primary gas chamber and the liquid in the piston for movement from a normal position toward the primary gas chamber, and a rod connecting the operating valve and the first mentioned valve to open the latter in the pressure controlled movement of the operating valve.

6. A construction as defined in claim 5, wherein the operating valve is limited in operating movement and wherein a spring is provided to predetermine the pressure difference to which the operating valve responds.

CHARLES ALBERT GRET.

REFERENCES CITED

The following references are of record in the file of this patent:

UNITED STATES PATENTS

| Number | Name | Date |
|---|---|---|
| 1,002,821 | Cowles et al. | Sept. 12, 1911 |
| 1,111,754 | Lieban | Sept. 29, 1914 |
| 1,289,132 | Eaton | Dec. 31, 1918 |
| 1,984,144 | Laugaudin | Dec. 11, 1934 |
| 2,031,000 | Mercier | Feb. 18, 1936 |
| 2,039,135 | Waugh et al. | Apr. 28, 1936 |
| 2,101,265 | Mercier | Dec. 7, 1937 |
| 2,150,390 | Mercier | Mar. 14, 1939 |
| 2,255,181 | Newton | Sept. 9, 1941 |
| 2,338,895 | Boulogne et al. | Jan. 11, 1944 |

FOREIGN PATENTS

| Number | Country | Date |
|---|---|---|
| 430,337 | Great Britain | June 13, 1935 |
| 852,704 | France | Nov. 9, 1939 |